United States Patent

[11] 3,601,886

| [72] | Inventors | Horst Gohren<br>Hannover;<br>Werner Hesse, Langenhagen, both of,<br>Germany |
|---|---|---|
| [21] | Appl. No. | 801,484 |
| [22] | Filed | Feb. 24, 1969 |
| [45] | Patented | Aug. 31, 1971 |
| [73] | Assignee | Max Muller Brinker Maschinenfabrik<br>Langenhagen, Germany |
| [32] | Priority | Feb. 24, 1968 |
| [33] | | Germany |
| [31] | | P 16 52 706.3 |

[54] AUTOMATIC TOOL CHANGING APPARATUS
4 Claims, 4 Drawing Figs.

[52] U.S. Cl. .................................................. 29/568,
29/26, 82/2
[51] Int. Cl. ..................................................B23q 3/155,
B23b 29/24
[50] Field of Search ..................................... 29/568, 26;
77/25; 82/2

[56] References Cited
UNITED STATES PATENTS

| 3,186,267 | 6/1965 | Pabst et al. .................... | 82/2 |
| 3,354,761 | 11/1967 | Sadier ........................... | 82/2 |
| Re.25,670 | 3/1958 | Hansen et al. ................. | 77/25 |
| 3,186,085 | 6/1965 | Coate ............................ | 29/568 |

Primary Examiner—Andrew R. Juhasz
Assistant Examiner—Z. R. Bilinsky
Attorney—Mason, Mason & Albright ABSTRACT: A lathe has a magazine mounted on a cross slide and arranged to be rotatable about its axis which is parallel to the longitudinal axis of the lathe. The magazine has a plurality of tool holders slidably mounted in it and a desired tool holder can be brought into a change position by appropriate magazine movement. A feeding device, movable longitudinally of the lathe, engages the selected tool holder in the change position and slides it onto a clamping slide rest positioned between the tool magazine and the workpiece.

AUTOMATIC TOOL CHANGING APPARATUS

BACKGROUND OF THE INVENTION

The invention relates to machine tool apparatus such as lathes, for example, and particularly to machine tool apparatus arranged for automatic tool changing under program control.

Numerically controlled lathes enable repetition work to be produced economically in small batches, for which purpose short preparation and setting-up times are essential.

A lathe equipped with a tool magazine is a particularly flexible production unit. Tool magazines can be charged quickly with whatever tools are to be used for a particular working operation or even for a number of such operations. In principal, this tool charging may be carried out manually or mechanically. Tool magazines are mounted out of range of the machining work, so that only one tool is engaged at any given moment. This makes it impossible for collision to occur between tools not in use and the workpiece, the chucking equipment or parts of the machine.

Various types of tool magazines exist. In the simplest case, the tool magazine is stationary and brings the stored tools into a given position, by either linear or rotary motion, from which they can be taken over by the tool clamping arrangements on the lathe slide. A particular feature of these existing devices is the inclusion of the magazine in the changeover action, without any intermediate transfer mechanism. The entire changeover cycle includes the following actions: movement of the slide to the tool-change position, unclamping of the tool, transfer to the magazine, location of a fresh tool in the magazine, transfer from the magazine to the clamping position, clamping of the tool and movement of the slide to the machining position. The mechanism is simple in construction, but is apt to entail long changeover times, especially with large tool magazines.

Another type of tool change is similarly based on the use of a stationary magazine, but employs a transfer mechanism between the tool magazine and the tool clamp on the slide. This eliminates from the time-consuming process of changeover the time taken for locating the tool in the tool magazine. The transfer mechanism substitutes the new tool for the old. In this arrangement, the process of locating the new tool has no effect on the changeover time. With such machines as these, the changeover time may be shorter than in the first case, but the design is more complicated.

Tool changers employing a stationary magazine may take a great deal of time for the movement of the slide between the machining position at the workpiece and the point of exchange. Mechanisms incorporating moving magazines have therefore been developed. It is possible to couple the magazine to the machine slide, the magazine drum being rigidly fixed, for example, to the cross-slide of a lathe. One requirement of moving-magazine mechanisms is that collisions must not be allowed to occur between the stored tools not required and the workpiece and so forth. This risk of collision exists basically with all tool turrets; it lies behind many problems in the tooling of turret heads. Moving-magazine mechanisms therefore require a transfer mechanism between the position of rest of the tool and its machining position, this taking the form of a compound turret in all the mechanisms known hitherto. A compound turret head enables the magazine to be positioned where there is no risk of collision and hence while machining is in process. However, to provide a complete safeguard against collision during the rotation of the compound turret head, it is necessary to move the cross-slide back with consequent loss of time. Moreover, a compound turret head fully equipped with tool clamps is very expensive.

BRIEF SUMMARY OF THE INVENTION

An object of the invention is to improve a machine tool, and more particularly a lathe, in such a way that the time taken to change the tools is reduced to the minimum and all risk of collision during the tool-changing action is completely excluded. This the invention achieves by the provision of a device whereby the suitably stored tool is moved lengthwise to the machining position and returned to its position of rest upon completion of its work.

Advantageously, the invention provides, in front of the magazine, a slide rest into which the appropriate tool holder moves as it is fed to the working position.

The slide rest may be provided with a clamping device with which the tool holder in the slide rest can be secured in the working position.

Each tool holder preferably has a recess in which a member secured to the feed mechanism engages when the tool is in the change position.

BRIEF DESCRIPTION OF THE DRAWINGS

A machine tool, that is to say a lathe, embodying the invention, will now be described, by way of example, with reference to the accompanying diagrammatic drawings in which.

DETAILED DESCRIPTION

Figure 1:
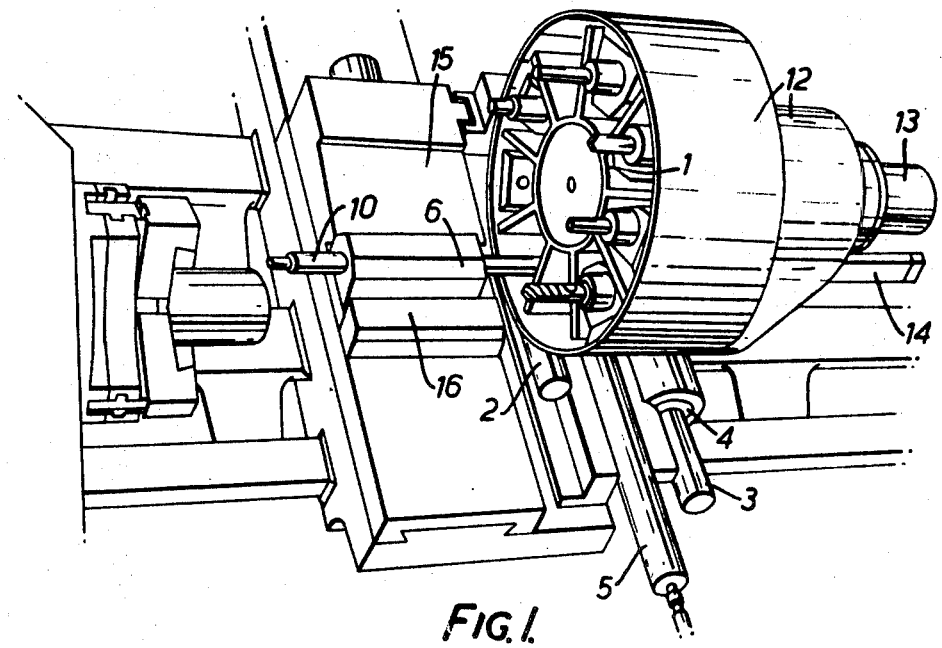
FIG. 1 is a perspective view of part of the lathe, with a tool in its working position.
Figure 2:
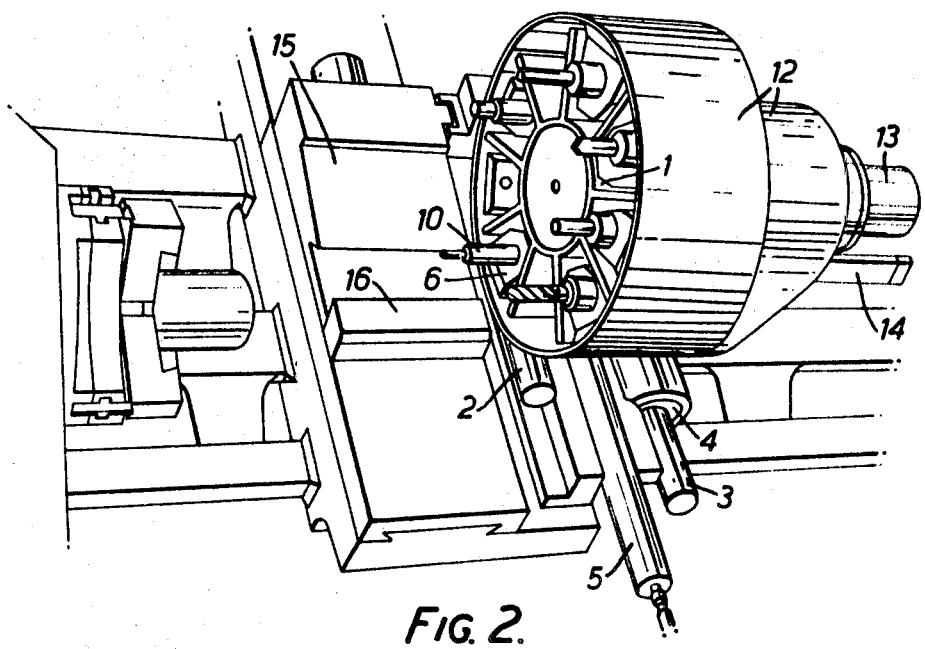
FIG. 2 is a perspective view of part of the lathe, with the tool in its position of rest.

The lathe has a drum-form magazine comprising a housing 12 in which a magazine structure 1 is rotatably supported. The magazine is arranged for movement along guides 2 and 3 of a cross-slide, at right angles to the longitudinal center line of the workpiece. In order to provide for this movement, the guides 2 and 3 carry cylindrical members 4 which are supported on the guides 2 and 3 by bearings allowing them to slide along the guides with almost frictionless movement; the members 4 support housing 12. In this way, the forces of reaction exerted on the machine slide are kept very small. The magazine is moved to and fro along the cross-slide by a hydraulic piston-cylinder assembly 5.

The reference numeral 6 indicates tool holders that can be inserted into corresponding recesses in the magazine structure 1. The retention of these tool holders 6 within the magazine is ensured by spring members consisting, in the example illustrated, of a catch 7 fixed to the tool holder 6, with which catch ball 9 is engaged by the action of a compression spring 8.

Each of the tool holders 6 accommodates a tool 10, preferably of the boring-bar type.

The magazine structure 1 is program controlled, with the aid of a suitable driving motor in conjunction with a positioning and indexing device 13, so as to be rotatable to bring one of the stored tools, that is to say whichever is chosen by the program, to a change position.

Figure 3:
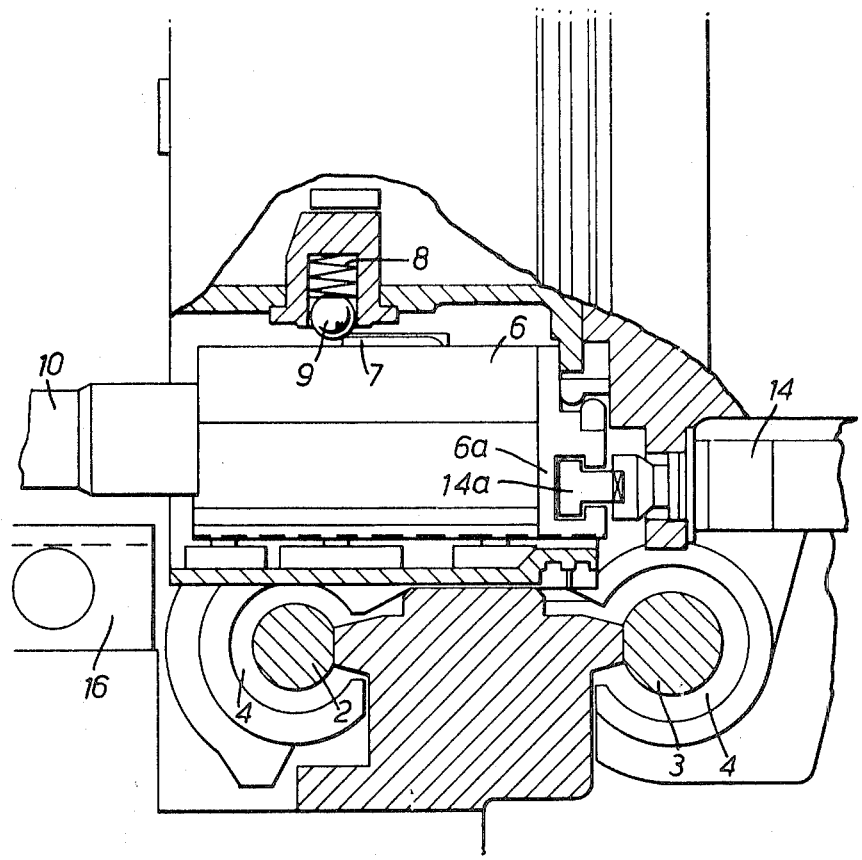
FIG. 3 shows the tool changer of the lathe, partly in section, with the tool in its position to rest.

The rear of each tool holder 6 contains a recess 6a (FIG. 3), in which a member 14a, secured to the feed 14, engages when the tool 10 is in the change position. This feed 14 moves the chosen tool lengthwise to the machining position and returns it to its position of rest upon completion of its work.

In front of the magazine is a slide rest 15, into which the appropriate tool holder moves as it is fed to the working position. Thus, the feed 14 moves the chosen tool holder 6, with its tool 10, by linear motion into the rest 15 in the cross-slide. This slide rest 15 incorporates members for accurately positioning the tool holder 6 in all planes. In the case illustrated, this is done with the aid of a clamp 16, the operation of which is not shown in detail.

As soon as a tool holder 6 has been moved into the slide rest 15 and a limit switch (not shown) signals that the tool holder 6 has taken up its working position, the clamp is operated. During the subsequent machine operation, the feed member 14 remains in its advanced position. The linear travel of this member is such that collision cannot occur between the tools stored out of use and the workpiece, chuck and so forth. It is desirable for this part of the lathe to be shielded from swarf, dust and coolant.

The mode of operation of the lathe will now be described.

Figure 4:
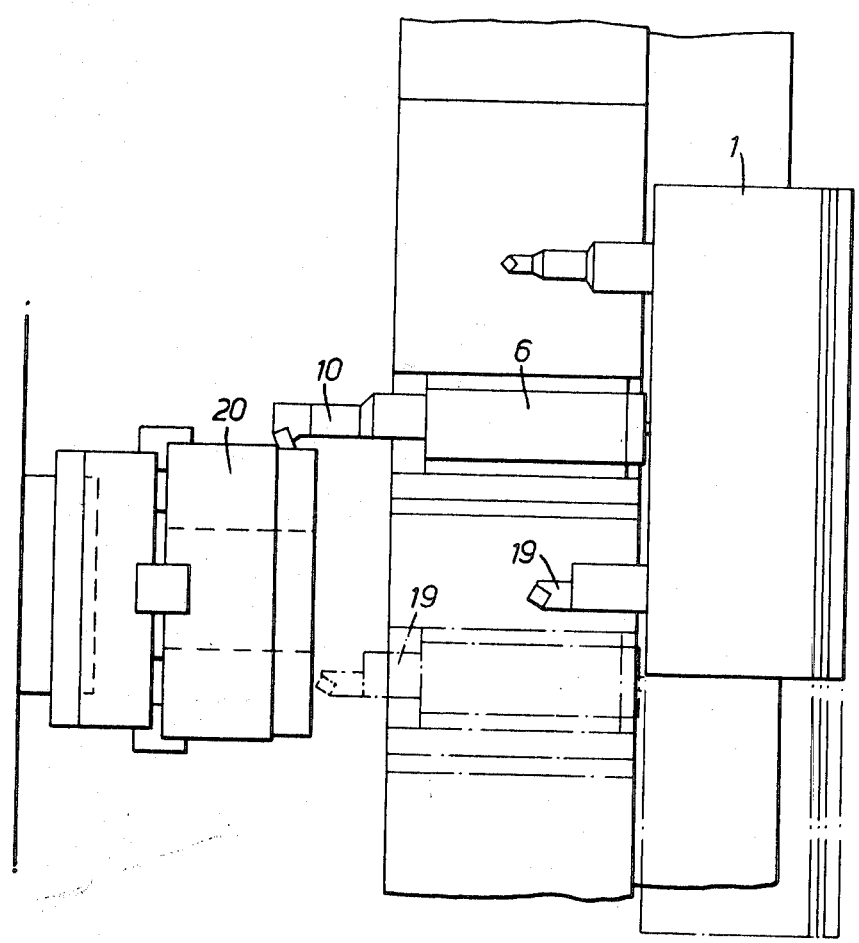
FIG. 4 is a plan of part of the lathe with two tools respectively in the working position and position of rest.

Let it be assumed that one particular tool 10, is to be used at the external circumference of, and a second tool 19 is to work on the face of, a workpiece 20 (FIG. 4).

When the tool 10 has finished work on the circumference of the workpiece 20, it is withdrawn under program control into the magazine. A limit switch (not shown) thereupon signals that the feed member 14 has reached its rearward position. This signal initiates the process of locating the other tool 19, and simultaneously determines the slide position for the face work. This positioning takes place with maximum speed. The drive of the magazine structure 1 permits the location search to be carried out clockwise of counterclockwise. Given a high speed of search, the result is practically always that the new tool 19 is in the change position before the slide has reached its new working position. The actual change-time thus comprises only these stages: tool release, withdrawal, forward feed and clamping; the locating time does not enter into it.

Notwithstanding this high performance, the design of the tool changer of the lathe described is very simple.

An important advantage of the lathe described is that collisions can be prevented even during the changeover and that the change-time is nevertheless extremely short.

What we claim is:

1. Machine tool apparatus, comprising:

a base, workpiece mounting means on said base for rotatably supporting a workpiece to be machined, a slide rest mounted on the base to be slidable along a path transverse to the rotational axis of the workpiece and defining a tool clamping location for supporting a tool in a machining position relative to the workpiece, a tool magazine rotatably mounted on said base and slidable thereon parallel to said path, a plurality of tool holders releasably located in the tool magazine in different angular locations with respect to the rotational axis of the machine and adapted to be successively brought into a predetermined change position which is fixed relative to the rotational axis of the magazine, as said magazine is rotated, each tool holder being constrained for movement parallel to the rotational axis of the magazine, program control means operative, in response to a program, to rotate the magazine about its rotational axis to select and position one of said tool holders in the predetermined change position and to control the sliding movement of the slide rest and the tool magazine whereby the predetermined change position is aligned with the tool clamping location, and feeding means movable along the base and operative to engage the selected tool holder in the change position and feed it with a single movement directly from the magazine into the tool clamping location and to return it to the magazine on completion of its work.

2. Apparatus according to claim 1, including clamping means on the slide rest and releasably operative to secure the selected tool holder in the clamping location thereon.

3. Apparatus according to claim 1, in which each tool holder defines a recess, and in which the feeding means comprises means for engaging the said recess in the selected one of the tool holders which is in the change position.

4. A lathe, comprising:

a base, rotatable work piece mounting means mounted on the base and rotatable about the longitudinal axis of the base, cross-slide means mounted on the base so as to define a slide path transverse to the longitudinal axis of the base, a drum-form tool magazine mounted on the base so as to be rotatable about an axis parallel to the said longitudinal axis and arranged to be carried slidably along the slide path defined by the slide means, first drive means for moving the magazine along the slide path, second drive means connected to the magazine for rotating it about its rotational axis, a plurality of tool holders releasably mounted in the magazine in annularly spaced positions whereby, as the magazine rotates, said tool holders are successively brought into a predetermined change position fixed relative to the rotational axis of the magazine, the tool holders being slidable relative to the magazine along lines parallel to the said longitudinal axis, a slide rest mounted on the cross-slide means between the magazine and the workpiece mounting means so as to be slidable along the slide path and defining a tool clamping location for holding a tool in a machining position relative to the workpiece program control means connected to the two drive means and operative in response to a predetermined program to position the magazine whereby a selected one of the tool holders is located in the predetermined change position, and the predetermined change position is aligned with the tool clamping location, and feeding means movable relative to the base in the direction of the longitudinal axis and operative to engage the selected one of the tool holders in the change position and to move it with a single movement into the tool clamping location on the slide rest for cooperation with the workpiece.